US008316321B2

(12) United States Patent
Ording et al.

(10) Patent No.: US 8,316,321 B2
(45) Date of Patent: *Nov. 20, 2012

(54) DYNAMICALLY CHANGING APPEARANCES FOR USER INTERFACE ELEMENTS DURING DRAG-AND-DROP OPERATIONS

(75) Inventors: Bas Ording, San Francisco, CA (US); Steven P. Jobs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/582,284

(22) Filed: Oct. 20, 2009

(65) Prior Publication Data

US 2010/0077336 A1 Mar. 25, 2010

Related U.S. Application Data

(63) Continuation of application No. 10/100,067, filed on Mar. 19, 2002, now Pat. No. 7,607,102.

(60) Provisional application No. 60/363,875, filed on Mar. 14, 2002.

(51) Int. Cl.
*G06F 3/048* (2006.01)
(52) U.S. Cl. ......... 715/817; 715/821; 715/825; 715/765
(58) Field of Classification Search .................. 715/769, 715/861, 817, 821, 825, 765
See application file for complete search history.

(56) References Cited

U.S. PATENT DOCUMENTS

| | | | |
|---|---|---|---|
| 5,333,256 A | 7/1994 | Green et al. | |
| 5,596,694 A | 1/1997 | Capps | |
| 5,598,524 A | 1/1997 | Johnston, Jr. et al. | |
| 5,742,286 A | 4/1998 | Kung et al. | |
| 5,754,179 A | 5/1998 | Hocker et al. | |
| 5,774,119 A | 6/1998 | Alimpich et al. | |
| 5,880,729 A | 3/1999 | Johnston, Jr. et al. | |
| 6,061,061 A | 5/2000 | Conrad et al. | |
| 6,535,230 B1 | 3/2003 | Celik | |
| 6,690,356 B2 | 2/2004 | Johnston et al. | |
| 6,848,081 B1 | 1/2005 | Yoda et al. | |

OTHER PUBLICATIONS

Research Disclosure, "Animated Icons," Sep. 1989.
Richard A. Bolt, "Human Interfaces for Managers," Computerworld in Depth, Jul. 16, 1984, pp. 1 to 18.
Herot et al., "A Prototype Spatial Data Management System," Computer Graphics Quarterly Report of SIGGRAPH-ACM, Jul. 1980, pp. 63-70.
"Enhanced Icon for Leading User Through Drag and Drop Process," IBM Technical Disclosure Bulletin, vol. 39, No. 3, Mar. 1, 1996, pp. 121-122.

*Primary Examiner* — Andrey Belousov
(74) *Attorney, Agent, or Firm* — Schwegman Lundberg & Woessner, P.A.

(57) ABSTRACT

A user interface includes elements whose appearance dynamically changes in dependence upon functions associated with the elements. In the case of an icon that is the destination for a drag-and-drop operation, the image displayed for the icon changes in accordance with the object being dragged to it, to represent the task that will be performed as a result of the drag-and-drop operation. The appearance of other elements involved in drag-and-drop operations can also be varied, to reflect the task at hand. As a result, the user is provided with more intuitive feedback regarding the functions that will be performed by the computer as a result of a drag-and-drop operation.

19 Claims, 4 Drawing Sheets

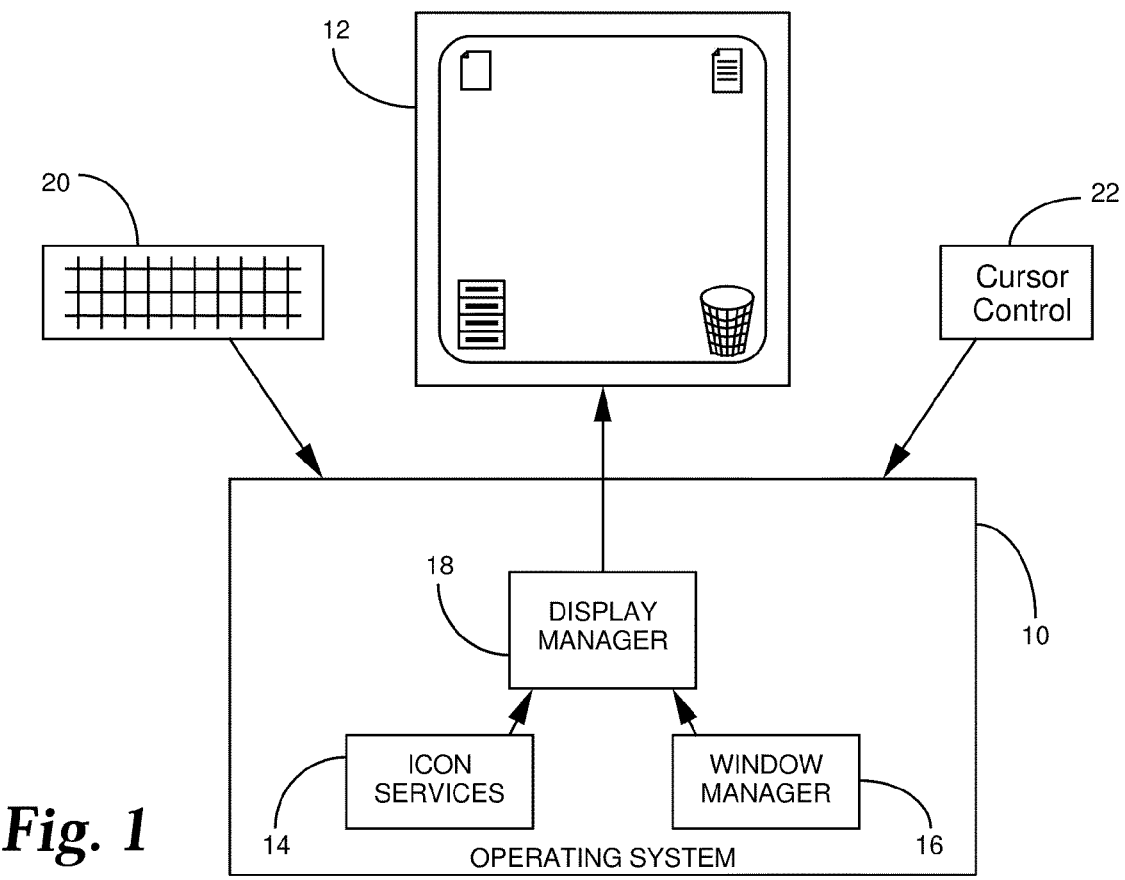
Fig. 1
| | Large | Small |
|---|---|---|
| Normal | IMG2A | IMG2B |
| Highlight | IMG2C | IMG2D |
| Dimmed | IMG2E | IMG2F |
Fig. 2
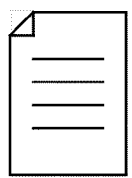 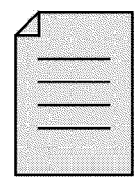 
*Fig. 2A*  *Fig. 2C*  *Fig. 2D*
  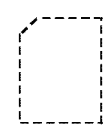
*Fig. 2B*  *Fig. 2D*  *Fig. 2F*

| ICON TRSH1738 ||
|---|---|
| Drag Type | Icon Image |
| Elec | IMG3A |
| Phys | IMG3B |

| ICON TRSH4695 |||
|---|---|---|
| Drag Type | Action | Icon Image |
| Elec | --- | IMG3A |
| Flop | --- | IMG3B |
| CD | 0 | IMG3B |
| CD | 1 | IMG3C |

DYNAMICALLY CHANGING APPEARANCES FOR USER INTERFACE ELEMENTS DURING DRAG-AND-DROP OPERATIONS

CROSS REFERENCE TO RELATED APPLICATIONS

This application is a continuation of application Ser. No. 10/100,067, filed Mar. 19, 2002, now U.S. Pat. No. 7,607,102, issued Oct. 20, 2009, which is a non-provisional patent application of Application No. 60/363,875, filed Mar. 14, 2002.

FIELD OF THE INVENTION

The present invention generally relates to graphical user interfaces for computer systems, and more particularly to a user interface having elements that provide an intuitive appearance to depict an operation being performed.

BACKGROUND OF THE INVENTION

An important aspect of any computer system is the interface that allows a user to input commands and data, and to receive the results of operations performed within the computer. In the area of personal computers, the graphical user interface (GUI) has become almost ubiquitous. The most popular types of GUI are based upon a metaphor that emulates the desktop environment. These types of GUI employ various visual elements to assist the user in managing information within the computer. Two fundamental elements are windows and icons. Windows function as container elements, via which information is presented to the user, and in which the user enters data to be input to the computer. The main, or root window, is commonly referred to as the "desktop" area and functions as the primary display region. An icon comprises an image that is displayed on the desktop, or within another window, and represents a particular object. For instance, an icon may represent a file containing data or a program. An icon can also be employed to represent a window that has been closed or minimized, container objects such as folders, and computer resources such as disk drives and printers. Selecting an icon, for example by means of a mouse or other cursor control device, enables the user to access the information or resource represented by that icon.

Another feature of many GUIs, that facilitates the user's ability to interact with the computer, is the drag-and-drop operation. An example of this type of operation is disclosed in U.S. Pat. No. 5,598,524, the disclosure of which is incorporated herein by reference. In essence, the drag-and-drop operation enables the user to perform a function by simply dragging an icon representing the object on which the function is to be performed, and placing it upon another icon. For example, the user can copy a file onto a disk by dragging the icon for the file onto the icon for the disk. When the user releases the file icon while it is positioned over the disk icon, the user interface recognizes this as a command to copy the file onto the disk, and performs the required task. As another example, the user can cause a document to be printed, without having to open an application program, by simply dragging the document's icon onto a printer icon.

In some cases, the icon that forms the destination of a drag-and-drop operation can represent different tasks, depending upon the nature of the object being dragged to the icon. An example of this can be seen, for example, in the case of the "trash" icon that is employed in the Macintosh Operating System, provided by Apple Computer, Inc. A user drags an object to this icon when the user desires to remove the object from the computer system. For instance, if a document is to be deleted from the computer's file system, the user drags the icon for the document to the trash icon. In consonance with the desktop metaphor, the trash icon has the appearance of a garbage can, or wastebasket, to reinforce the user's understanding that the document being "deposited" on the trash icon is being disposed of.

In addition to the deletion of documents, files and folders, the trash icon can be employed to perform other functions. For example, the user can drag an image of a removable disk to the trash icon, which causes the disk to be automatically ejected from the disk drive of the computer. In this case, the user may not find the dragging of the disk icon to the image of a trash can to be intuitive. More particularly, placing an object in the trash can creates the impression that the object is being thrown away. However, it is not the user's intention to dispose of the removable disk, but merely to remove it from the computer housing. Hence, a novice user may be reluctant drag the image of a disk to the trash can for fear that it may perform an unwanted action, such as deleting all of the files on the disk.

In some cases, therefore, the appearance of an element in a graphical user interface may not be consistent with a task that is being performed, particularly in those situations where the element is associated with more than one task. It is an objective of the present invention, therefore, to provide a graphical user interface in which the images associated with icons and other user interface elements provide intuitive feedback regarding the types of functionality associated with those elements.

SUMMARY OF THE INVENTION

In pursuit of this objective, the present invention provides a user interface having elements whose appearance dynamically changes in dependence upon characteristics of an object associated with a drag-and-drop operation. In one exemplary embodiment, if the element is an icon that is the destination for a drag-and-drop operation, the image displayed for the icon changes in accordance with the object being dragged to it, to represent the task that will be performed as a result of the drag-and-drop operation or to represent a characteristic of the object being dragged. The appearance of other elements involved in drag-and-drop operations can also be varied, to reflect the task at hand. These other elements can include the icon for the object being dragged, the cursor that is used to drag the icon, and control elements associated with resources involved in the task.

In the case of a trash icon, for example, its appearance can be mapped to the type of object being dragged to it. If the object is one that is to be deleted from the computer's file system, such as a document or folder, the trash icon can have the appearance of a disposal container, such as a wastebasket or garbage can. If the dragged object is a physical device that is to be removed from the computer, the trash icon can display an image associated with ejecting the device from the system. Other functions associated with various objects that can be dragged to the trash icon can similarly cause the appearance of the icon to change to an image appropriate to that function.

As a result, the user is provided with more intuitive feedback regarding characteristics of objects being dragged and/or the functions that will be performed by the computer as a result of a drag-and-drop operation.

Further features of the invention, and the advantages provided thereby, are explained in greater detail hereinafter, with reference to exemplary embodiments of the invention.

BRIEF DESCRIPTION OF THE FIGURES

FIG. 1 is a block diagram of the general architecture of a computer system in which the present invention can be implemented;

FIG. 2 illustrates a table containing data regarding different images associated with an icon;

FIGS. 2A-2F illustrate the different images represented in the table of FIG. 2;

DETAILED DESCRIPTION

Figure 3A:
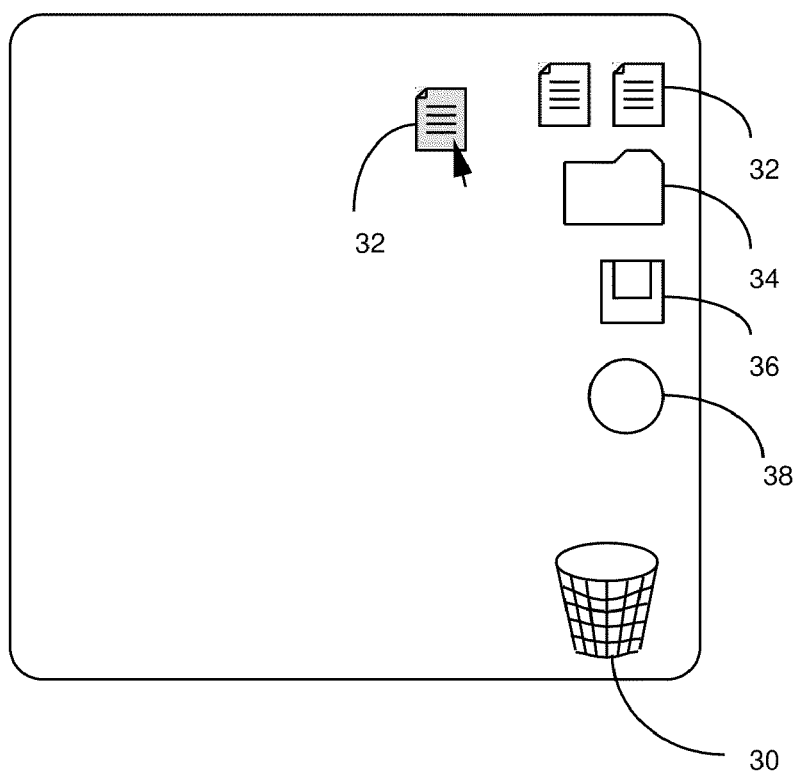
FIGS. 3A-3C are representative examples of a display, illustrating different appearances for a trash icon.

To facilitate an understanding of the features of the invention and the principles upon which it is based, exemplary embodiments are described hereinafter in which the appearance of icons are dynamically varied in accordance with a characteristic of an object being dragged to them, and/or the type of function that will be performed as a result of a drag-and-drop operation. It will be appreciated, however, that the references to icons are illustrative only. The principles which underlie the invention can be applied to any type of element employed within a graphical user interface, to provide users with more intuitive representations of the characteristics of objects within a computer system and/or the functions associated with those objects.

FIG. 1 is a block diagram of the components of a personal computer that may be involved in the implementation of the present invention. Generally, the graphical user interface forms part of the computer's operating system 10. Examples of operating systems which provide a graphical user interface include the Macintosh® Operating System of Apple Computer, Inc., and the Windows® operating system provided by Microsoft Corporation. The graphical user interface employs various services of the operating system that are responsible for generating information that appears on the computer system's display 12, such as a CRT monitor or an LCD flat panel screen. These services include icon services 14, which control the appearance and position of icons on the display, and a windows manager 16, which controls the appearance, size and position of windows that appear on the screen. Each of these services communicates with a display manager 18 that also forms part of the operating system. The display manager is responsive to commands received from the icon services and the windows manager, and generates the signals that control the display 12 to present the designated images.

User input to the computer system is accomplished by means of a keyboard 20 and a cursor control device 22, such as a mouse, trackpad, pen, or the like. As is known, the user employs the cursor control device 22 to position a cursor appearing on the display, and actuates one or more control buttons to select and move objects, as well as to activate control elements to provide input. The movements of the cursor and actuation of the control buttons are fed as inputs to the appropriate elements of the operating system, to cause corresponding changes in the user interface appearing on the display 12. For example, when the user clicks a button on the cursor control device 22, the location of the cursor is supplied to the icon services 14, along with an indication that a button has been clicked. If an icon is being displayed at that location, the icon services can function to change the appearance of the icon, e.g. make it darker, to provide an indication that it has been selected as a result of the user action.

For this purpose, the icon for any given object may have a family of several different images. Some of these images may relate to different states of the object, whereas others may pertain to different user preference items. FIG. 2 illustrates an example of a table storing information about the family of icon images stored in connection with a particular object, in this case a document. The left side of the table illustrates three different states for the icon, namely normal, highlighted and dimmed. The top of the table depicts two different choices for a user preference item. In this example, the user has the ability to select whether large or small icons are to be displayed. Each combination of state and size has a stored icon image associated with it. FIG. 2A illustrates the image for the icon in its normal state and large size, whereas FIG. 2B illustrates the normal state and small size. FIGS. 2C and 2D illustrate the highlighted state of the icon, for the large and small sizes, respectively. FIGS. 2E and 2F illustrate the dimmed state of the icon, again for the large and small sizes. In dependence upon the state of the object associated with an icon and the user-chosen size, the icon services 14 selects the appropriate image and provides it to the display manager 18.

In accordance with the present invention, another dimension of variation is provided for icon images to reflect the characteristics of a drag-and-drop operation. In one embodiment of the invention, the icon representing the destination for a drag-and-drop operation has its appearance varied in dependence upon the task associated with the drag-and-drop operation.

Figure 3B:
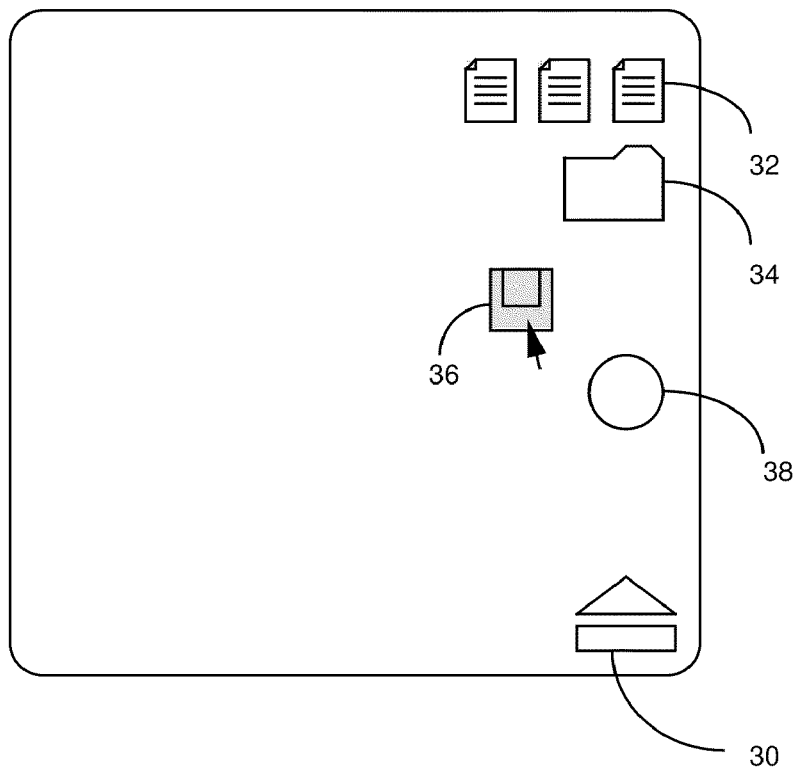
Figures 3C, 4, 5:
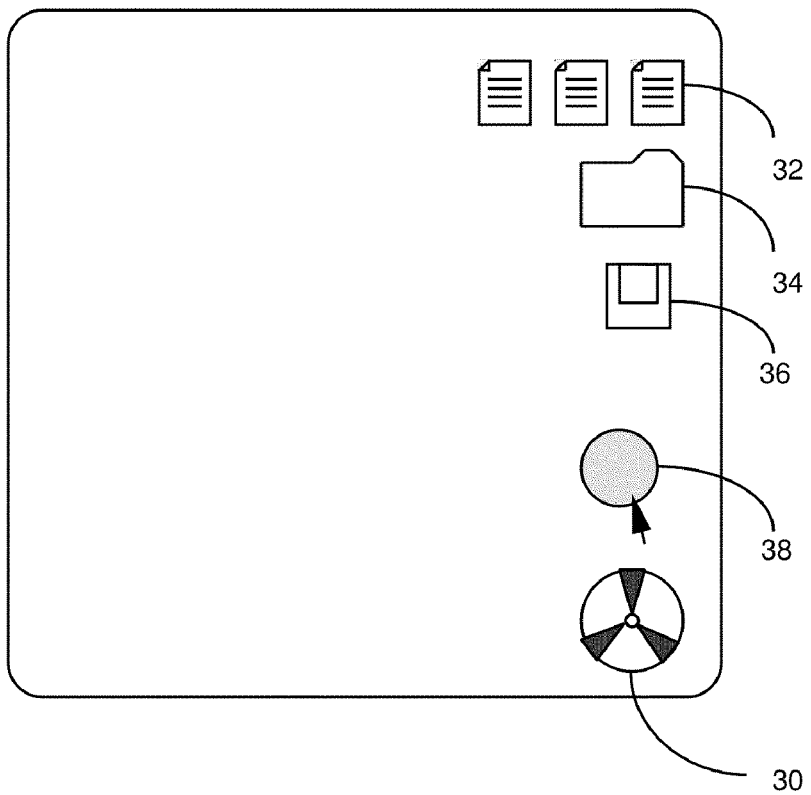
FIG. 4 is a mapping table of the different images for the trash icon.
FIG. 5 is a mapping table for a second embodiment of the invention.

For example, with references to FIGS. 3A-3C, various types of objects can be dragged to a trash icon 30, to remove them from the computer system. For instance, as depicted in these figures, the user can drag a document 32, a folder 34, a floppy disk 36 or a compact disk (CD) 38 to the trash icon 30. In the case of documents 32 and folders 34, the effect of dragging them to the trash icon is to delete them from the computer's file system. For this purpose, an appropriate image for the icon 30 is that of a container associated with the disposal of objects, such as a wastebasket as shown in FIG. 3A, or a garbage can. In the case of the floppy disk 36 and the CD 38, however, the act of dragging their icons to the trash icon 30 does not result in a deletion of those objects. Rather, it causes them to be ejected from the corresponding drive mechanisms in the computer. In this case, the image of a wastebasket or garbage can may not be suitable, since it does not provide the most appropriate metaphor for the task being implemented. In accordance with the present invention, therefore, when one of these types of objects is being dragged to the trash icon, the image for the icon is changed to symbolize the nature of the object, which determines the action that will be undertaken when the object is dropped onto the icon. FIG. 3B illustrates the situation in which the icon for the floppy disk 36 is being dragged to the trash. In this case, it can be seen that the appearance of the icon 30 has been changed to the image of a symbol which represents the ejection of an object from the system.

In one implementation of the invention, the image that is displayed for the destination of a drag-and-drop operation can be based upon the type of object being dragged. In this regard, the operating system stores type information for each object that is stored in the computer system's memory. In the example described above, the determination of the appropriate image to display for the trash icon can be based upon whether the object is a physical object, such as a removable storage medium, or an electronic object, for example a file system object such as a folder or a file. For this purpose, the information that is stored in the icon services 14 for each icon can include a flag, or bit, that indicates whether multiple "personalities" are associated with the icon. If so, a mapping table is provided for the icon, that indicates the different images that are respectively displayed in association with the various personalities. An example of such a mapping table for the trash icon is illustrated in FIG. 4. The left column of the table depicts the different types of objects that can be dragged to the icon. In the case of the trash icon, for example, the objects are classified as physical or electronic. Each object type has an associated image that is stored in the icon services, and the mapping table includes a pointer to that image, e.g. IMG3A or IMG3B.

In operation, one of the images can be designated as the default image, and is displayed at all times except when an object of a predetermined type is being dragged. For instance, in the case of the trash icon, the default image could be the wastebasket depicted in FIG. 3A. This image is displayed at all times, except when the user is dragging an icon for a physical object. When the user selects a physical object, this information is provided to the icon services, which checks whether any icon currently being displayed has its flag set to indicate multi-image capability. If so, the icon image table for that icon is checked, to determine whether the object that has just been selected is of the type that requires a change in appearance. If so, the image data for the new appearance is retrieved and provided to the display manager 18, to cause the icon to change appearance, as illustrated in FIG. 3B.

The change in appearance can occur as soon as the object is selected. Alternatively, it may be preferable to wait until a selected object is being dragged by the user before determining whether to change the appearance of potential destination icons, to thereby minimize the frequency of appearance changes.

The foregoing example illustrates the situation in which two different functions are associated with the trash icon, namely to delete a file system object or eject a physical object such as a disk. It will be appreciated, however, that the number of functions is not limited, and each function can have a separate icon image associated with it. With further reference to the trash icon, it is possible to perform different kinds of operations on an object to be removed, depending upon the state of the object. For example, the CD icon 38 may represent a blank CD that the user has inserted into computer's disk drive. The user can drag the icons for one or more documents 32 onto the icon for the CD 38, to indicate that the user desires to store copies of the documents on the CD. However, each file is not automatically copied, or "burned" onto the CD as it is dropped onto the icon 38. Rather, it is necessary for the user to explicitly indicate that the burn operation is to take place, preferably after all of the desired files have been dragged to the CD icon 38. If the user drags the CD icon 38 to the trash icon 30 before initiating the burn operation, the image that is displayed for the trash icon can be a burn symbol, as illustrated in FIG. 3C. This image advises the user that there are files to be burned onto the CD before it is ejected from the computer. If the user completes the drag-and-drop operation, a dialog window can be displayed, to have the user confirm that the burn operation should take place before the CD is ejected.

FIG. 5 illustrates an example of an icon image mapping table for this embodiment of the invention. In this case, the operating system distinguishes between different types of removable physical objects. If the object is a floppy disk, the eject symbol image is displayed, as in the example of FIG. 3B. If, however, the object is a CD, a further determination is made with respect to the state of the CD, namely whether there is information to be burned onto it. This might be determined, for example, by reference to the state of an action flag associated with the icon. If the flag is set, indicating that there is information to be stored on the CD, the burn symbol image, depicted in FIG. 3C, is displayed. Otherwise, the eject symbol image of FIG. 3B is displayed.

Figure 6A:
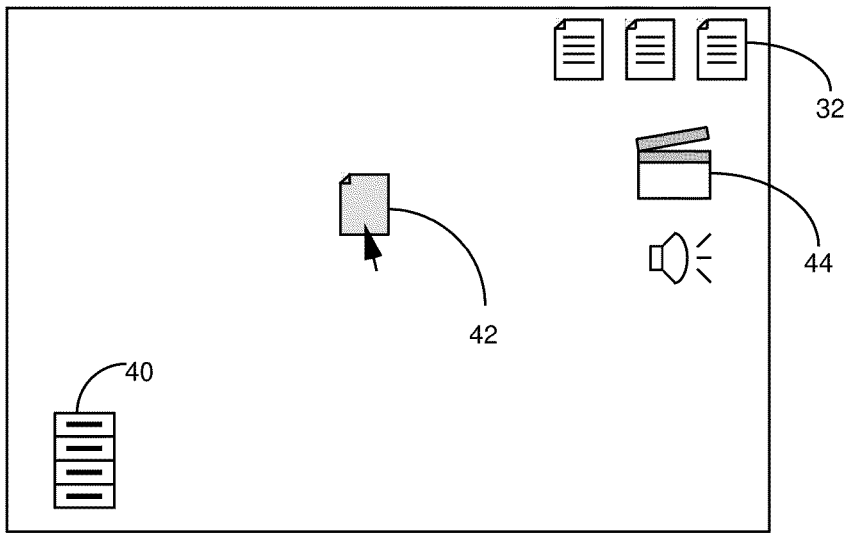
FIGS. 6A-6C are representative examples of a display, illustrating another embodiment of the invention.
Figure 6B:
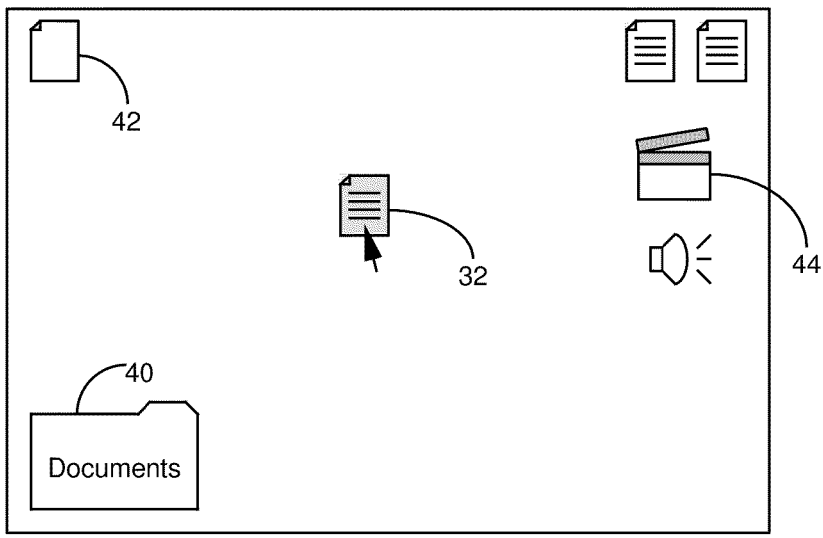
Figure 6C:
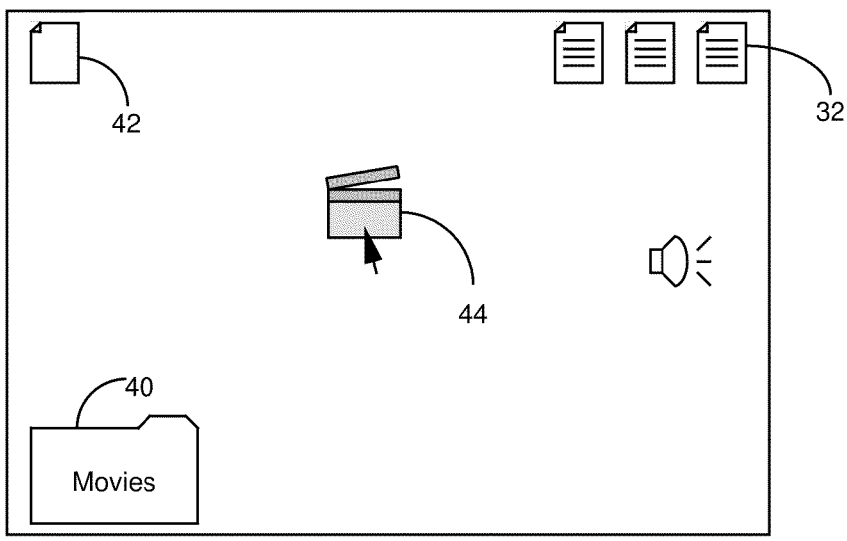

While the foregoing embodiments of the invention have been described with reference to the trash icon, it will be appreciated that the principles of the invention can be employed for any user interface element associated with a drag-and-drop operation. For instance, an icon might be associated with the computer's file system, such as the Finder icon associated with the Macintosh® Operating System. An example of a file system icon 40 is illustrated in FIG. 6A. When a user drags a file 42 to this icon, the file is stored in the computer's file system. Depending upon the type of file, it can be stored in different folders within the file system. In accordance with the present invention, the image that is displayed for the file system icon can change, in accordance with the area in which the file is to be stored. For instance, as shown in FIG. 6B, if the user drags a text file 32 to the file system icon, the icon 40 might appear as a "Documents" folder, to indicate that the file is being stored in that folder. Conversely, if the user drags a movie file 44 to the file system icon 40, the appearance of that icon can change to a "Movies" folder, as shown in FIG. 6C. Thus, rather than generically informing the user that the file is being stored within the file system, the change in appearance of the file system icon 40 provides the user with better feedback regarding the precise location at which the file is being stored.

As another example, the user may drag a file to a printer icon, to cause the file to be printed. Depending upon the nature of the file, it may be sent to one of several different printers. For example, a black and white text file may be sent to a monochrome printer, whereas a color graphics file may be sent to a higher resolution, color printer. In this situation, the icon for the printer can change appearance, to indicate the particular printer to which the dragged file will be sent.

From the foregoing, therefore, it can be seen that the present invention provides the user with more intuitive feedback regarding the tasks that are performed as a result of a drag-and-drop operation. In these examples, the appearance of the icon which functions as the destination for the drag-and-drop operation is changed, in accordance with the result to be accomplished. It will be appreciated, however, that other elements of the user interface can have similar behavior. For instance, it may be preferable to change the appearance of the icon being dragged, in addition to, or lieu of, the destination icon. Likewise, the cursor that is used to drag the icon can change its appearance, to provide an indication of the operation being performed.

In a further aspect of the invention, the dynamic icon functionality can be extended to application programs that are aware of this feature in the user interface. More particularly, an application having such an awareness can provide the icon services with an image that is to be displayed by a particular icon whenever an object associated with that application is selected. For instance, the developer of a drawing program may create an image of an eraser that is to be employed whenever a drawing created with that program is to be deleted, to symbolize a slate being wiped clean. When the drawing program is installed on a computer, it can supply this image to icon services along with an identification of the icon to which it is to be applied, i.e. the trash icon, and the type of object with which it is to be associated, e.g. files with the extension "dwg". This information is added to the tables such as those depicted in FIGS. 4 and 5. Subsequently, when a drawing object is selected, the image of the eraser is displayed for the trash icon.

It will be appreciated by those of ordinary skill in the art that the present invention can be embodied in other forms without departing from the spirit or essential characteristics thereof. The presently disclosed embodiments are therefore considered in all respects to be illustrative and not restrictive. The scope of the invention is indicated by the appended claims, rather than the foregoing description, and all changes that come within the meaning and range of equivalence thereof are intended to be embraced therein.

The invention claimed is:

1. A computer system, comprising:
    a display device that displays icons representative of objects in the computer system, at least some of the objects being classified into at least a first type or a second type corresponding to respective first and second actions that can be performed on the objects;
    a memory storing first and second images for a destination icon that is associated with both of the first and second actions, wherein the first and second images respectively correspond to said first and second actions; and
    an operating system that:
        detects that an icon associated with a classified object has been selected,
        determines which type of object is associated with the selected icon, and
        displays the destination icon with the first image or the second image in accordance with the type of object determined to be associated with the selected icon.

2. The computer system of claim 1 wherein the destination icon is associated with actions pertaining to the removal of an object from the computer system, and the first and second images correspond to whether an object being removed is a physical object.

3. The computer system of claim 1 wherein the destination icon is associated with the storage of an object, and the first and second images designate different storage operations.

4. The computer system of claim 3 wherein the different storage operations pertain to different destinations for the objects being stored.

5. The computer system of claim 1 wherein the first and second images pertain to different destinations for objects being acted upon.

6. A computer system, comprising:
    a display device that displays objects in the computer system, at least some of the objects being classified into at least a first type or a second type corresponding to respective first and second actions that can be performed on the objects;
    a memory storing first and second images for an element of the graphical user interface that respectively correspond to the first and second actions; and
    an operating system that:
        detects that a classified object has been selected,
        determines which type of object has been selected, and
        displays the element with the first image or the second image in accordance with the type of object determined to have been selected.

7. The computer system of claim 6 wherein the element is an icon that represents a destination to which the selected object can be dragged.

8. The computer system of claim 7 wherein the destination icon is associated with actions pertaining to the removal of a selected object from the computer system, and the first and second images correspond to whether a selected object is a physical object.

9. The computer system of claim 7 wherein the destination icon is associated with the storage of an object, and the first and second images designate different storage operations.

10. The computer system of claim 9 wherein the different storage operations pertain to different destinations for the objects being stored.

11. The computer system of claim 6 wherein the first and second images pertain to different destinations for objects being acted upon.

12. The computer system of claim 6 wherein the element is an icon associated with the selected object.

13. A computer system, comprising:
    a display device that displays objects in the computer system, at least some of the objects being classified into at least a first type or a second type;
    a memory storing first and second images for an element of the graphical user interface that respectively correspond to the first and second object types; and
    an operating system that:
        detects that a classified object has been selected,
        determines which type of object has been selected, and
        displays the element with the first image or the second image in accordance with the type of object determined to have been selected.

14. The computer system of claim 13 wherein the element is an icon that represents a destination to which the selected object can be dragged.

15. The computer system of claim 14 wherein the destination icon is associated with the removal of a selected object from the computer system, and the first and second images correspond to whether the selected object is a physical object.

16. The computer system of claim 14 wherein the destination icon is associated with the storage of an object, and the first and second images designate different storage operations.

17. The computer system of claim 16 wherein the different storage operations pertain to different destinations for the objects being stored.

18. The computer system of claim 13 wherein the first and second images pertain to different respective destinations for a selected object.

19. The computer system of claim 13 wherein the element is an icon associated with the selected object.

* * * * *